(12) United States Patent
Oyamada et al.

(10) Patent No.: US 12,325,090 B2
(45) Date of Patent: Jun. 10, 2025

(54) COVERED ELECTRODE FOR HIGH-Cr FERRITIC HEAT-RESISTANT STEELS

(71) Applicant: Kobe Steel, Ltd., Kobe (JP)

(72) Inventors: Hiromi Oyamada, Kanagawa (JP); Hideaki Takauchi, Kanagawa (JP); Yoshimasa Muranishi, Kanagawa (JP); Shigenobu Namba, Hyogo (JP); Takeo Miyamura, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 952 days.

(21) Appl. No.: 17/435,745

(22) PCT Filed: Mar. 23, 2020

(86) PCT No.: PCT/JP2020/012794
§ 371 (c)(1),
(2) Date: Sep. 2, 2021

(87) PCT Pub. No.: WO2020/196431
PCT Pub. Date: Oct. 1, 2020

(65) Prior Publication Data
US 2022/0134486 A1 May 5, 2022

(30) Foreign Application Priority Data

Mar. 26, 2019 (JP) .................. 2019-058117

(51) Int. Cl.
| | | |
|---|---|---|
| *B23K 35/02* | (2006.01) | |
| *B23K 9/173* | (2006.01) | |
| *B23K 35/30* | (2006.01) | |
| *C22C 38/02* | (2006.01) | |
| *C22C 38/04* | (2006.01) | |
| *C22C 38/44* | (2006.01) | |
| *C22C 38/46* | (2006.01) | |
| *C22C 38/48* | (2006.01) | |
| *C22C 38/52* | (2006.01) | |
| *C22C 38/54* | (2006.01) | |
| *B23K 103/04* | (2006.01) | |

(52) U.S. Cl.
CPC .......... *B23K 35/0261* (2013.01); *B23K 9/173* (2013.01); *B23K 35/3093* (2013.01); *C22C 38/02* (2013.01); *C22C 38/04* (2013.01); *C22C 38/44* (2013.01); *C22C 38/46* (2013.01); *C22C 38/48* (2013.01); *C22C 38/52* (2013.01); *C22C 38/54* (2013.01); *B23K 2103/04* (2018.08)

(58) Field of Classification Search
CPC ................ B23K 35/0261; B23K 9/173; B23K 35/3093; B23K 2103/04; B23K 2101/18; B23K 9/23; B23K 35/3086; B23K 35/404; B23K 35/30; B23K 35/365; C22C 38/02; C22C 38/04; C22C 38/44; C22C 38/46; C22C 38/48; C22C 38/52; C22C 38/54; C22C 38/001; C22C 38/06; C22C 38/22; C22C 38/34; C22C 38/42; C22C 38/50; C21D 9/50
See application file for complete search history.

(56) References Cited

U.S. PATENT DOCUMENTS

| | | |
|---|---|---|
| 2014/0332517 A1 | 11/2014 | Barhorst et al. |
| 2014/0349136 A1 | 11/2014 | Barhorst et al. |
| 2018/0133848 A1 | 5/2018 | Barhorst et al. |
| 2019/0030636 A1 | 1/2019 | Mukai et al. |
| 2020/0215651 A1 | 7/2020 | Barhorst et al. |

FOREIGN PATENT DOCUMENTS

| | | | | |
|---|---|---|---|---|
| JP | 2002-146484 A | | 5/2002 | |
| JP | 2018122329 A | * | 8/2018 | ......... B23K 35/0272 |
| KR | 10-2016-0006208 A | | 1/2016 | |
| KR | 10-2016-0144924 A | | 12/2016 | |
| KR | 10-2018-0121936 A | | 11/2018 | |

* cited by examiner

*Primary Examiner* — Anthony M Liang
*Assistant Examiner* — Danny N Kang
(74) *Attorney, Agent, or Firm* — Oblon, McClelland, Maier & Neustadt, L.L.P.

(57) ABSTRACT

Provided is a covered electrode for high-Cr ferritic heat-resistant steels with which it is possible to obtain weld metal that has the toughness required for weld parts and has excellent high temperature strength. The covered electrode for high-Cr ferritic heat-resistant steels includes a steel core and a coating agent that coats the core. The covered electrode comprises C, Si, Mn, Ni, Cr, Mo, V, Co, B, Nb, W, N, and Fe each in a predetermined range in the total mass of the covered electrode, contains a slag forming agent, and has a total of the W content and the Co content of 2.8 mass % or more.

8 Claims, No Drawings

COVERED ELECTRODE FOR HIGH-Cr FERRITIC HEAT-RESISTANT STEELS

TECHNICAL FIELD

The present invention relates to a covered electrode suitable for welding of high-Cr ferritic heat-resistant steels.

BACKGROUND ART

The shielded metal arc welding is a welding method where a covered electrode (which may also be simply referred to as 'welding rod' or 'hand rod') having a flux called a coating ingredient, a protective material and the like on a core wire is used as an electrode, and an arc is generated between the welding rod and a base metal which are melted with arc heat to join a target object. The shielded metal arc welding is the simplest welding method that does not require a shield gas, and can also be used outdoors in strong winds, so that it is widely used for various manufacturing plants, buildings, ships, vehicles, and the like.

Among structures that are manufactured by the shielded metal arc welding, for example, boilers and turbines for power generation and various heat-resistant and pressure-resistant steel pipes are used under high-temperature and high-pressure conditions, and therefore, are particularly required to have high-temperature strength and crack resistance. High-Cr ferritic heat-resistant steel has been developed to meet such requirements, and the covered electrode used for the same has also been proposed in each construction method. For example, PTL 1 discloses a covered electrode capable of obtaining a weld metal having excellent creep rupture property and excellent toughness.

CITATION LIST

Patent Literature

PTL 1: JP-A-2018-122329

SUMMARY OF INVENTION

Technical Problem

However, the steam temperature and vapor pressure in structures such as boilers as described above become higher from a standpoint of improving thermal efficiency, and in particular, further improvement is required for the high temperature strength of weld metal.

The present invention has been made in view of the above situations, and an object of the present invention is to provide a covered electrode for high-Cr ferritic heat-resistant steel capable of obtaining a weld metal having excellent high temperature strength while securing toughness required for a welded part.

Solution to Problem

A covered electrode for high-Cr ferritic heat-resistant steels according to an aspect of the present invention is a covered electrode having a steel core wire and a coating ingredient that coats the core wire, the covered electrode containing, with respect to the total mass of the covered electrode, C: 0.04 mass % or more and 0.12 mass % or less,
Si: 0.8 mass % or more and 2.0 mass % or less,
Mn: 0.3 mass % or more and 1.0 mass % or less,
Ni: 0.01 mass % or more and 1.00 mass % or less,
Cr: 6.0 mass % or more and 7.6 mass % or less,
Mo: 0.02 mass % or more and 0.20 mass % or less,
V: 0.1 mass % or more and 0.3 mass % or less,
Co: 1.8 mass % or more and 4.0 mass % or less,
B: 0.04 mass % or more and 0.12 mass % or less,
Nb: 0.05 mass % or more and 0.35 mass % or less,
W: 1.0 mass % or more and 2.5 mass % or less,
N: 0.01 mass % or more and 0.03 mass % or less, and
Fe: 50 mass % or more and 80 mass % or less, and
a slag forming ingredient,
wherein a sum of the content of W and the content of Co is 2.8 mass % or more.

The covered electrode for high-Cr ferritic heat-resistant steel preferably satisfies any one of
P: 0.05 mass % or less,
S: 0.008 mass % or less,
Cu: 0.10 mass % or less,
Ti: 0.5 mass % or less, and
Al: 0.10 mass % or less, with respect to the total mass of the covered electrode.

In the covered electrode for high-Cr ferritic heat-resistant steel, a coating ratio of the coating ingredient is preferably 20% or more and 45% or less.

In the covered electrode for high-Cr ferritic heat-resistant steel, a content of the slag forming ingredient is preferably 15 mass % or more and 35 mass % or less with respect to the total mass of the covered electrode.

Advantageous Effects of Invention

According to the present invention, it is possible to provide the covered electrode for high-Cr ferritic heat-resistant steel capable of a weld metal having excellent high temperature strength while securing toughness required for a welded part.

DESCRIPTION OF EMBODIMENTS

Hereinafter, the embodiments of the present invention will be described in detail. Note that, the present invention is not limited to the embodiments to be described later, and can be arbitrarily changed and implemented without departing from the gist of the present invention.

In order to solve the above problems, the inventors carefully studied and found the followings. If a content of W having an effect of improving strength is increased, δ ferrite that is a brittle structure is likely to be generated, which lowers toughness of a weld metal. Therefore, when a content of W, a content of Co having an effect of suppressing generation of δ ferrite, and a summed content thereof are adjusted appropriately and contents of Ni, Cr, V and B, which are elements affecting high-temperature strength of the weld metal, are also controlled in a balanced manner, it is possible to obtain a weld metal having excellent high-temperature strength while securing desired toughness.

[Composition of Covered Electrode]

In the below, as for the covered electrode of the present embodiment, reasons to add components and to limit compositions thereof are described in detail. Note that, components below may be added to one or both of a steel core wire and a coating ingredient. In the below, each alloy component content (%) in the covered electrode is a content with respect to a total mass of the covered electrode, and is indicated by mass %.

<C: 0.04 Mass % or More and 0.12 Mass % or Less>

C is an element that forms carbides and contributes to improvement on the creep rupture property of a weld metal.

If a content of C is less than 0.04 mass %, the effect cannot be sufficiently obtained. Therefore, the content of C with respect to the total mass of the covered electrode is 0.04 mass % or more, and preferably 0.07 mass % or more.

On the other hand, when the content of C exceeds 0.12 mass %, carbides may excessively coarsen to lower the toughness of the weld metal. Therefore, the content of C with respect to the total mass of the covered electrode is 0.12 mass % or less, and preferably 0.11 mass % or more.

Note that, when adding C from the coating ingredient, C may be added with being contained in another metal raw material.

<Si: 0.8 Mass % or More and 2.0 Mass % or Less>

Si is an element that functions as a deoxidizing ingredient and improves strength and toughness of the weld metal.

If a content of Si is less than 0.8 mass %, the effect cannot be sufficiently obtained. Also, Si is an element that contributes to improvement on welding workability. If the content of Si is less than 0.8 mass %, the welding workability is deteriorated, so that defects are generated in the weld metal. Therefore, the content of Si with respect to the total mass of the covered electrode is 0.8 mass % or more, and preferably 1.2 mass % or more.

On the other hand, if the content of Si exceeds 2.0 mass %, the strength of the weld metal excessively increases and the toughness is deteriorated. Therefore, the content of Si with respect to the total mass of the covered electrode is 2.0 mass % or less, and preferably 1.6 mass % or less.

Note that, in the present embodiment, Si indicates a total amount of an Si conversion value of metal or alloy and an Si conversion value of $SiO_2$. In addition, when adding Si from the coating ingredient, Si may be added by Fe—Si and the like.

<Mn: 0.3 Mass % or More and 1.0 Mass % or Less>

Mn is an element that functions as a deoxidizing ingredient and improves strength and toughness of the weld metal.

If a content of Mn is less than 0.3 mass %, δ ferrite is likely to be generated during welding. Since the generated δ ferrite does not disappear even when a heat treatment is performed after welding, the δ ferrite generated during welding may have a bad influence on the creep rupture property and toughness of the weld metal. Therefore, the content of Mn with respect to the total mass of the covered electrode is 0.3 mass % or more, and preferably 0.4 mass % or more.

On the other hand, since Mn is an austenite-generating element, if the content of Mn exceeds 1.0 mass %, reverse transformed austenite is generated during the heat treatment and the toughness is deteriorated. Therefore, the content of Mn with respect to the total mass of the covered electrode is 1.0 mass % or less, and preferably 0.8 mass % or less.

Note that, when adding Mn from the coating ingredient, Mn may be added by Fe—Mn and the like.

<Ni: 0.01 Mass % or More and 1.00 Mass % or Less>

Ni is an austenite-generating element, and is an element that suppresses generation of ferrite badly influencing the toughness. Ni is also an element that promotes diffusion of alloy elements in matrices.

If a content of Ni is less than 0.01 mass %, the effect cannot be sufficiently obtained. Therefore, the content of Ni with respect to the total mass of the covered electrode is 0.01 mass % or more, and preferably 0.30 mass % or more.

On the other hand, if the content of Ni exceeds 1.00 mass %, diffusion of B is promoted, and when metal elements such as Cr, Fe and Mo are denoted as M, Ostwald ripening of carbide particles expressed by $M_{23}C_6$ (hereinafter, also simply referred to as "$M_{23}C_6$ particles") is likely to proceed, so that the creep rupture property of the weld metal is deteriorated. Therefore, the content of Ni with respect to the total mass of the covered electrode is 1.00 mass % or less, and preferably 0.90 mass % or less.

Note that, when adding Ni from the coating ingredient, Ni may be added by Fe—Ni and the like.

<Cr: 6.0 Mass % or More and 7.6 Mass % or Less>

Cr is a main alloy element that is contained in high-Cr ferritic heat-resistant steel, which is a weld target of the covered electrode of the present embodiment. Also, Cr is an essential element for forming $M_{23}C_6$ particles, improving the creep rupture property of the weld metal and securing oxidation resistance and corrosion resistance of the weld metal.

If a content of Cr is less than 6.0 mass %, the properties of the weld metal cannot be sufficiently secured. Therefore, the content of Cr with respect to the total mass of the covered electrode is 6.0 mass % or more, and preferably 6.5 mass % or more.

On the other hand, if the content of Cr exceeds 7.6 mass %, δ ferrite is likely to be generated during welding. Since the generated δ ferrite does not disappear even when the heat treatment is performed after welding, the δ ferrite generated during welding may have a bad influence on improvements on the creep rupture property and toughness of the weld metal. Therefore, the content of Cr with respect to the total mass of the covered electrode is 7.6 mass % or less, and preferably 7.1 mass % or less.

Note that, when adding Cr from the coating ingredient, Cr may be added by Fe—Cr and the like.

<Mo: 0.02 Mass % or More and 0.20 Mass % or Less>

Mo is an element that improves the creep rupture property of the weld metal by solid-solution hardening.

If a content of Mo is less than 0.02 mass %, the effect cannot be sufficiently obtained. Therefore, the content of Mo with respect to the total mass of the covered electrode is 0.02 mass % or more, and preferably 0.06 mass % or more.

If the content of Mo exceeds 0.20 mass %, δ ferrite is likely to be generated during welding. Since the generated δ ferrite does not disappear even when a heat treatment is performed after welding, the δ ferrite generated during welding may have a bad influence on improvements on the creep rupture property and toughness of the weld metal. Therefore, the content of Mo with respect to the total mass of the covered electrode is 0.20 mass % or less, and preferably 0.18 mass % or less.

Note that, when adding Mo from the coating ingredient, Mo may be added by Fe—Mo and the like.

<V: 0.1 Mass % or More and 0.3 Mass % or Less>

V is an element that forms MX-type carbonitrides ([M: Nb, V], [X: C, N]) to improve the creep rupture property of the weld metal. In addition, V fixes N as MX-type carbonitrides to reduce a content of B to be generated as BN, and increases an amount of B to be dissolved in $M_{23}C_6$ particles to suppress Ostwald ripening of $M_{23}C_6$ particles.

If a content of V is less than 0.1 mass %, the effect cannot be sufficiently obtained. Therefore, the content of V with respect to the total mass of the covered electrode is 0.1 mass % or more, and preferably 0.12 mass % or more.

On the other hand, if the content of V exceeds 0.3 mass %, δ ferrite is generated during welding and Ostwald ripening of MX type carbonitrides is caused at high temperatures, so that the creep rupture property and toughness of the weld metal are deteriorated. Therefore, the content of V with respect to the total mass of the covered electrode is 0.3 mass % or less, and preferably 0.28 mass % or less.

Note that, when adding V from the coating ingredient, V may be added with being contained in another metal raw material.

<Co: 1.8 Mass % or More and 4.0 Mass % or Less>

Co is an element that suppresses generation of δ ferrite during welding and improves the creep rupture property and toughness of the weld metal. In the present embodiment, it is possible to increase the high-temperature strength of the weld metal while securing required toughness by setting an upper limit of a content of W, which increases the strength of the weld metal but promotes generation of δ ferrite, to 2.5 mass % and adjusting a content of Co that suppresses generation of δ ferrite.

If a content of Co is less than 1.8 mass %, the effect cannot be sufficiently obtained. Therefore, the content of Co with respect to the total mass of the covered electrode is 1.8 mass % or more, preferably 2.0 mass % or more, and more preferably 2.2 mass % or more.

On the other hand, if the content of Co exceeds 4.0 mass %, the strength of the weld metal excessively increases and the toughness is deteriorated. Therefore, the content of Co with respect to the total mass of the covered electrode is 4.0 mass % or less, preferably 3.9 mass % or less, and more preferably 3.8 mass % or less.

Note that, when adding Co from the coating ingredient, Co may be added by Fe—Co and the like.

<B: 0.04 Mass % or More and 0.12 Mass % or Less>

B is an element that is dissolved in $M_{23}C_6$ particles to suppress Ostwald ripening of $M_{23}C_6$ particles and to improve the creep rupture property of the weld metal.

If a content of B is less than 0.04 mass %, the effect cannot be sufficiently obtained. Therefore, the content of B with respect to the total mass of the covered electrode is 0.04 mass % or more, and preferably 0.05 mass % or more.

On the other hand, if the content of B exceeds 0.12 mass %, the strength of the weld metal excessively increases and the required toughness cannot be secured. Therefore, the content of B with respect to the total mass of the covered electrode is 0.12 mass % or less, and preferably 0.11 mass % or less.

Note that, when adding B from the coating ingredient, B may be added with being contained in another metal raw material.

<Nb: 0.05 Mass % or More and 0.35 Mass % or Less>

Nb is an element that forms MX-type nitrides to improve the creep rupture property of the weld metal.

If a content of Nb is less than 0.05 mass %, the effect cannot be sufficiently obtained. Therefore, the content of Nb with respect to the total mass of the covered electrode is 0.05 mass % or more, and preferably 0.07 mass % or more.

On the other hand, if the content of Nb exceeds 0.35 mass %, the strength of the weld metal excessively increases and the toughness is deteriorated. Therefore, the content of Nb with respect to the total mass of the covered electrode is 0.35 mass % or less, and preferably 0.30 mass % or less.

Note that, when adding Nb from the coating ingredient, Nb may be added with being contained in another metal raw material.

<W: 1.0 Mass % or More and 2.5 Mass % or Less>

Similar to Mo, W is an element that improves the creep rupture property of the weld metal by solid-solution hardening, is precipitated as Laves phase at grain boundaries at high temperatures, and hinders diffusion of B at grain boundaries to suppress Ostwald ripening of $M_{23}C_6$ particles.

If a content of W is less than 1.0 mass %, the effect cannot be sufficiently obtained. Therefore, the content of W with respect to the total mass of the covered electrode is 1.0 mass % or more, preferably 1.2 mass % or more, and more preferably 1.5 mass % or more. On the other hand, if W is excessively contained in the covered electrode, δ ferrite is likely to be generated during welding. Since the generated δ ferrite does not disappear even when the heat treatment is performed after welding, the δ ferrite generated during welding may have a bad influence on improvements on the creep rupture property and toughness of the weld metal.

In the present embodiment, as described above, it is possible to increase the strength of the weld metal while securing required toughness by setting an upper limit of the content of W to 2.5 mass % and adjusting the content of Co that suppresses generation of δ ferrite. Therefore, the content of W with respect to the total mass of the covered electrode is 2.5 mass % or less, preferably 2.3 mass % or less, and more preferably 2.1 mass % or less.

Note that, when adding W from the coating ingredient, W may be added by Fe—W and the like.

<[W]+[Co]: 2.8 Mass % or More>

As described above, W is an element that improves the strength of the weld metal but promotes generation of δ ferrite to deteriorate toughness of the weld metal. On the other hand, since Co has the effect of suppressing generation of δ ferrite, even when the content of W is increased so as to increase the strength of the weld metal, it is possible to prevent the toughness of the weld metal from decreasing by adjusting the content of Co.

When the content of W with respect to the total mass of the covered electrode is denoted as [W] and the content of Co is denoted as [Co], if each content of W and Co is adjusted within each of the above described ranges and [W]+[Co]) (a sum of the content of W and the content of Co) is 2.8 mass % or more, it is possible to obtain the weld metal having excellent high-temperature strength while securing toughness.

Note that, [W]+[Co] is preferably 3.0 mass % or more, more preferably 3.6 mass % or more, and particularly preferably more than 4.2 mass %.

<N: 0.01 Mass % or More and 0.03 Mass % or Less>

Similar to Nb, N is an element that forms MX-type carbonitrides to improve the creep rupture property of the weld metal.

If a content of N is less than 0.01 mass %, the effect cannot be sufficiently obtained. Therefore, the content of N with respect to the total mass of the covered electrode is 0.01 mass % or more, and preferably 0.012 mass % or more.

On the other hand, if the content of N exceeds 0.03 mass %, the strength of the weld metal excessively increases and the toughness is deteriorated. Therefore, the content of N with respect to the total mass of the covered electrode is 0.03 mass % or less, and preferably 0.028 mass % or less.

Note that, when adding N from the coating ingredient, N may be added with being contained in another metal raw material.

<P: 0.05 Mass % or Less (Including 0 Mass %)>

P is an element that enhances high-temperature cracking. When a content of P is 0.05 mass % or less in a solidification temperature range and temperatures immediately below the range in a process of forming a weld metal, the high temperature cracking can be suppressed. Therefore, the content of P with respect to the total mass of the covered electrode is preferably 0.05 mass % or less, more preferably 0.01 mass % or less, and particularly preferably 0.008 mass % or less.

<S: 0.008 Mass % or Less (Including 0 Mass %)>

S is an element that enhances the sensitivity to high temperature cracking. When a content of S is 0.008 mass % or less, high temperature cracking of the weld metal can be suppressed. Therefore, the content of S with respect to the total mass of the covered electrode is preferably 0.008 mass % or less, and more preferably 0.006 mass % or less.

<Cu: 0.10 Mass % or Less (Including 0 Mass %)>

Cu is an austenite-generating element, and has an effect of suppressing generation of δ ferrite, which has a bad influence on toughness.

If a content of Cu is 0.10 mass % or less, the crack resistance of the weld metal is improved and the creep strength is improved. Therefore, the content of Cu with respect to the total mass of the covered electrode is preferably 0.10 mass % or less, more preferably 0.05 mass % or less, and particularly preferably 0.03 mass % or less.

On the other hand, the content of Cu is preferably 0.001 mass % or more, and more preferably 0.005 mass % or more.

<Ti: 0.5 Mass % or Less (Including 0 Mass %)>

Ti is an element that forms MX-type carbonitrides and contributes improvement on the creep rupture property of the weld metal.

If a content of Ti is 0.5 mass % or less, the excessive increase in strength of the weld metal is suppressed to improve toughness. Therefore, the content of Ti with respect to the total mass of the covered electrode is preferably 0.5 mass % or less, more preferably 0.1 mass % or less, and particularly preferably 0.08 mass % or less.

On the other hand, the content of Ti is preferably 0.001 mass % or more, and more preferably 0.005 mass % or more.

<Al: 0.10 Mass % or Less (Including 0 Mass %)>

Al is an element that acts as a deoxidizing ingredient.

If a content of Al is 0.10 mass % or less, generation of coarse oxides is suppressed and toughness of the weld metal is improved. Therefore, the content of Al with respect to the total mass of the covered electrode is preferably 0.10 mass % or less, more preferably 0.05 mass % or less, and particularly preferably 0.04 mass % or less.

On the other hand, the content of Al is preferably 0.001 mass %, and more preferably 0.01 mass % or more.

<Remainder>

The covered electrode of the present embodiment contains Fe and a slag forming ingredient, in addition to the above-described elements. The slag forming ingredient has not only a main purpose of forming slag but also a purpose as an arc stabilizer and a gas generating ingredient. As the slag forming ingredient, $CaCO_3$, $CaF_2$, $BaCO_3$, $BaF_2$, $SiO_2$, $K_2O$, $Al_2O_3$, $CaSO_4$ and the like may be exemplified.

A content of the slag forming ingredient with respect to the total mass of the covered electrode is preferably 15 mass % or more, and more preferably 20 mass % or more. The content of the slag forming ingredient with respect to the total mass of the covered electrode is preferably 35 mass % or less, and more preferably 30 mass % or less.

In the covered electrode of the present embodiment, a content of Fe with respect to the total mass of the covered electrode is 50 mass % or more, more preferably 55 mass % or more, and more preferably 60 mass % or more. The content of Fe with respect to the total mass of the covered electrode is 80 mass % or less, preferably 75 mass % or less, and more preferably 70 mass %.

In addition, as unavoidable impurities, Zr, Li, Sn, Sb, As and the like may be exemplified. Note that, in addition to the above-described components, other components may also be contained without departing from the effects of the present invention.

In the covered electrode of the present embodiment, a sum of C, Si, Mn, Ni, Cr, Mo, V, Co, B, Nb, W, N, Fe and the slag forming ingredient is preferably 90 mass % or more, more preferably 93 mass % or more, further more preferably 96 mass % or more, and particularly preferably 98 mass % or more, with respect to the total mass of the covered electrode.

Subsequently, the core wire and the coating ratio are described.

[Core Wire]

In the present embodiment, although the core wire is not particularly limited, a core wire having a diameter of 2.6 mm to 6.0 mm, and particularly preferably 4.0 mm, may be used.

[Coating Ratio]

In the present embodiment, the coating ratio of the coating ingredient on an outer periphery of the core wire is not particularly limited. However, from standpoints of securing strength of the coating ingredient, and the like, the coating ratio is preferably 20% or more, more preferably 25% or more, and particularly preferably 30% or more. In addition, from standpoints of arc stability and the like, the coating ratio is preferably 45% or less, more preferably 40% or more, and particularly preferably 36% or less.

[Method of Manufacturing Covered Electrode]

A method of manufacturing the above-described covered electrode is not particularly limited. For example, the covered electrode of the present embodiment can be manufactured by mixing a coating ingredient raw material together with water glass, applying the mixed coating ingredient to the outer periphery of the core wire, and drying and firing the coating ingredient.

EXAMPLES

In the below, Invention Examples and Comparative Examples are described in more detail. However, the present invention is not limited thereto.

[Manufacturing of Covered Electrode]

The two kinds of core wires having diameters of 5.0 mm and 4.0 mm were prepared, and the coating ingredient was applied on the outer peripheries of the core wires with the coating ratio of 34%, which were then dried. Thereby, the covered electrodes having component compositions (the remainder is Fe, the slag forming ingredient and the unavoidable impurities) and core wire diameters shown in Table 1 were manufactured. Note that, the contents of the chemical components shown in Table 1 are contents with respect to the total mass of the covered electrode and are indicated by mass %.

TABLE I

| | | Chemical Components of Covered Electrode (mass %) | | | | | | | | | | | | | | | | | Diameter of Core Wire (mm) |
|---|---|---|---|---|---|---|---|---|---|---|---|---|---|---|---|---|---|---|---|
| | | C | Si | Mn | Ni | Cr | Mo | V | Co | B | Nb | W | N | [W] + [Co] | P | S | Cu | Ti | Al | |
| Invention Examples | A | 0.09 | 1.3 | 0.6 | 0.62 | 6.7 | 0.06 | 0.2 | 2.5 | 0.09 | 0.08 | 2.2 | 0.01 | 4.7 | 0.01 | 0.004 | 0.01 | <0.1 | 0.04 | 5.0 |
| | B | 0.09 | 1.4 | 0.7 | 0.02 | 6.7 | 0.08 | 0.2 | 2.5 | 0.09 | 0.08 | 2.2 | 0.01 | 4.7 | 0.01 | 0.003 | 0.01 | <0.1 | 0.04 | 4.0 |
| | C | 0.09 | 1.4 | 0.7 | 0.02 | 6.7 | 0.06 | 0.2 | 2.5 | 0.06 | 0.08 | 2.2 | 0.01 | 4.7 | 0.01 | 0.003 | 0.01 | <0.1 | 0.04 | 4.0 |
| | D | 0.09 | 1.4 | 0.7 | 0.02 | 6.7 | 0.06 | 0.2 | 2.5 | 0.06 | 0.08 | 2.2 | 0.01 | 4.7 | 0.01 | 0.003 | 0.01 | <0.1 | 0.04 | 4.0 |
| | E | 0.09 | 1.4 | 0.7 | 0.24 | 6.8 | 0.08 | 0.2 | 2.5 | 0.06 | 0.08 | 2.2 | 0.01 | 4.7 | 0.01 | 0.004 | 0.01 | <0.1 | 0.03 | 4.0 |
| | F | 0.09 | 1.4 | 0.7 | 0.02 | 6.7 | 0.08 | 0.2 | 2.5 | 0.09 | 0.08 | 2.2 | 0.01 | 4.7 | 0.01 | 0.003 | 0.01 | <0.1 | 0.04 | 5.0 |
| | G | 0.09 | 1.4 | 0.5 | 0.39 | 6.8 | 0.08 | 0.2 | 2.5 | 0.11 | 0.08 | 2.2 | 0.01 | 4.7 | 0.01 | 0.004 | 0.01 | <0.1 | 0.04 | 4.0 |
| Comparative Examples | H | 0.09 | 0.4 | 0.3 | 1.01 | 7.0 | 0.08 | <0.1 | 2.6 | 0.12 | 0.32 | 1.3 | 0.01 | 3.9 | <0.01 | 0.004 | <0.01 | <0.1 | 0.02 | 4.0 |
| | I | 0.09 | 1.3 | 0.6 | 1.68 | 5.6 | 0.06 | 0.2 | 2.5 | 0.09 | 0.08 | 2.2 | 0.01 | 4.7 | 0.01 | 0.004 | 0.01 | 0.1 | 0.04 | 5.0 |
| | J | 0.09 | 1.5 | 0.7 | 0.02 | 6.7 | 0.06 | 0.2 | 2.5 | <0.01 | 0.08 | 2.2 | 0.01 | 4.7 | 0.01 | 0.003 | 0.01 | 0.1 | 0.03 | 4.0 |

[Welding]

Then, using the covered electrodes, three-layer buttering was performed on a steel plate of mild steel. At this time, the backing material part was made into two-layer buttering. Thereafter, the main welding was performed under predetermined conditions, and a post weld heat treatment (PWHT) was performed at temperatures of 740 to 780° C. For the covered electrodes having the core wire diameters of 5.0 mm and 4.0 mm, the base metal, welding conditions and PWHT conditions are shown in Table 2.

TABLE 2

| Core wire | Diameter | 5.0 mm | 4.0 mm |
|---|---|---|---|
| Base metal | Plate thickness | 20 mm | |
| | Groove angle, Shape | 20°, V-shape | |
| | Root gap | 19 mm | 16 mm |
| Welding conditions | Current | 200-220 A Proper current 210 A | 140-160 A Proper current 150 A |
| | Voltage | 25-30 V | |
| | Preheating inter-pass temperature | 250-300° C. | |
| | Build-up method | 7-layer 14-passes or 8-layer 16 passes | |
| PWHT | Temperature, time | 740-780° C. × 4 hours | |

[Evaluations]

Subsequently, for the weld metals after PWHT at temperatures and times shown in Table 3, following diverse tests were performed to evaluate high-temperature strength, toughness and crack resistance of the weld metals. The evaluation results of the diverse tests are also shown in Table 3.

<High-Temperature Strength>

For the weld metals after PWHT, the high-temperature tensile test was performed at 650° C. according to JIS Z3111, and 0.2% yield strength was calculated. The weld metals with an obtained value of 220 MPa or more were regarded as acceptable.

<Toughness>

For the weld metals after PWHT, the Charpy impact test was performed at 20° C. according to JIS Z2242 to measure absorbed energy vE(J) and to evaluate the toughness. Note that, the weld metals with an absorbed energy of 15 J or higher obtained by measurement were regarded as favorable.

<Crack Resistance>

For the weld metals after PWHT, the crack resistance was evaluated by observing visually whether a bead surface was cracked. Note that, the weld metals with no crack were regarded as acceptable.

TABLE 3

| | | PWHT Temperature (° C.) | PWHT Time (h) | High-Temperature Strength 0.2% yield strength at 650° C. (MPa) | Toughness Absorbed energy vE at 20° C. (J) | Crack resistance Crack or No crack? |
|---|---|---|---|---|---|---|
| Invention Examples | A | 740 | 4 | 275 | 27 | No |
| | B | 780 | 4 | 220 | 39 | No |
| | C | 740 | 4 | 269 | 32 | No |
| | D | 760 | 4 | 239 | 15 | No |
| | E | 760 | 4 | 221 | 51 | No |
| | F | 740 | 4 | 290 | 26 | No |
| | G | 760 | 4 | 237 | 23 | No |
| Comparative Examples | H | 740 | 4 | 195 | 34 | No |
| | I | 775 | 4 | 182 | 21 | No |
| | J | 760 | 4 | 212 | 34 | No |

As shown in Tables 1 and 3, in the cases of Invention Examples A to G, the contents of all the chemical components in the covered electrodes were within the ranges of the present invention. Therefore, according to the welding results using these covered electrodes, it is possible to obtain the weld metal having excellent high-temperature strength and crack resistance while securing required toughness.

On the other hand, in the case of Comparative Example H, the contents of Si and V in the covered electrodes are less than the lower limits of the present invention, and the content of Ni exceeds the upper limit of the present invention.

Also, in the case of Comparative Example I, the content of Cr in the covered electrode is less than the lower limit of the present invention, and the content of Ni exceeds the upper limit of the present invention.

Also, in the case of Comparative Example J, the content of B in the covered electrode is less than the lower limit of the present invention.

As a result, in the cases of Comparative Examples H to J, the high-temperature strengths were all low.

As described above, according to the present invention, it is possible to provide the covered electrode for high-Cr ferritic heat-resistant steels capable of obtaining a weld metal having excellent high temperature strength while securing toughness required for a welded part.

Although the diverse embodiments have been described with reference to the drawings, the present invention is not limited thereto. It is apparent to one skilled in the art that a variety of changes or modifications can be made within the scope defined in the claims, and it is understood that the changes or modifications are also included within the technical scope of the present invention. In addition, the respective constitutional elements in the embodiments can be arbitrarily combined without departing from the gist of the invention.

The subject application is based on Japanese Patent Application No. 2019-058117 filed on Mar. 26, 2019, the contents of which are incorporated herein for reference.

The invention claimed is:

1. A covered electrode having a steel core wire and a coating ingredient that coats the core wire,
    wherein the covered electrode comprises, with respect to the total mass of the covered electrode:
    C: 0.04 mass % or more and 0.12 mass % or less,
    Si: 1.2 mass % or more and 2.0 mass % or less,
    Mn: 0.3 mass % or more and 1.0 mass % or less,
    Ni: 0.01 mass % or more and 1.00 mass % or less,
    Cr: 6.0 mass % or more and 7.6 mass % or less,
    Mo: 0.02 mass % or more and 0.20 mass % or less,
    V: 0.1 mass % or more and 0.3 mass % or less,
    Co: 1.8 mass % or more and 4.0 mass % or less,
    B: 0.04 mass % or more and 0.12 mass % or less,
    Nb: 0.05 mass % or more and 0.35 mass % or less,
    W: 1.0 mass % or more and 2.5 mass % or less,
    N: 0.01 mass % or more and 0.03 mass % or less,
    Fe: 50 mass % or more and 80 mass % or less, and
    a slag forming ingredient,
    wherein a sum of the content of W and the content of Co is more than 4.2 mass %.

2. The covered electrode according to claim 1, further comprising any one selected from the group consisting of:
    P: 0.05 mass % or less,
    S: 0.008 mass % or less,
    Cu: 0.10 mass % or less,
    Ti: 0.5 mass % or less, and
    Al: 0.10 mass % or less, each with respect to the total mass of the covered electrode.

3. The covered electrode according to claim 1,
    wherein a coating ratio of the coating ingredient is 20% or more and 45% or less.

4. The covered electrode according to claim 2,
    wherein a coating ratio of the coating ingredient is 20% or more and 45% or less.

5. The covered electrode according to claim 1,
    wherein a content of the slag forming ingredient is 15 mass % or more and 35 mass % or less with respect to the total mass of the covered electrode.

6. The covered electrode according to claim 2,
    wherein a content of the slag forming ingredient is 15 mass % or more and 35 mass % or less with respect to the total mass of the covered electrode.

7. The covered electrode according to claim 3,
    wherein a content of the slag forming ingredient is 15 mass % or more and 35 mass % or less with respect to the total mass of the covered electrode.

8. The covered electrode according to claim 4,
    wherein a content of the slag forming ingredient is 15 mass % or more and 35 mass % or less with respect to the total mass of the covered electrode.

* * * * *